June 16, 1959  G. C. GRIFFIN  2,890,500
DOOR FRAME CONSTRUCTION
Filed Oct. 30, 1957
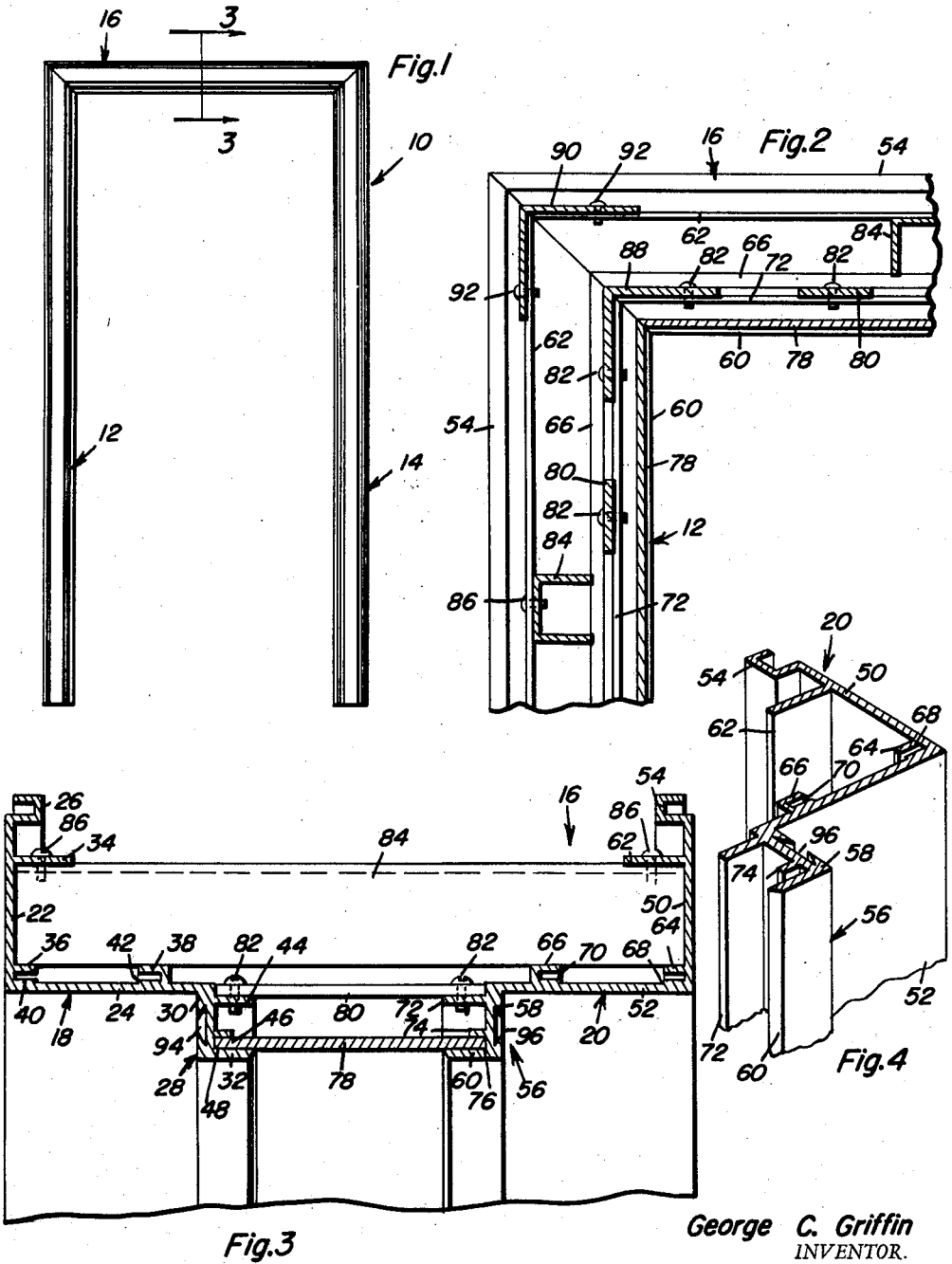
George C. Griffin
INVENTOR.

United States Patent Office 2,890,500
Patented June 16, 1959

2,890,500

DOOR FRAME CONSTRUCTION

George C. Griffin, Jacksonville, Fla.

Application October 30, 1957, Serial No. 693,342

4 Claims. (Cl. 20—11)

This invention relates in general to new and useful improvements in door frame constructions, and more specifically to a variable width frame assembly.

In recent years metal door frames have become prominent. However, inasmuch as metal door frames are normally either bent or extruded, and since the width of the door frames vary depending upon the thickness of wall in which the door frame is mounted, it will be seen that dies must be kept on hand in order to make door frames of all widths.

It is therefore the primary object of this invention to provide a variable width door frame member which is formed primarily of a pair of identical, but oppositely disposed frame elements, the frame elements being disposed in spaced relation and the space therebetween being filled by a filler strip, the filler strip being of a variable width whereby the effective width of the door frame member may be varied as desired.

Another object of this invention is to provide a simple door frame construction which may be varied in width, the door frame construction being formed of a plurality of door frame members, each of the door frame members being formed of a pair of oppositely disposed frame elements which may be readily extruded, the frame elements being so constructed whereby the space therebetween may be readily filled with a filler strip, the filler strip being formed of sheet metal which may be cut to the desired width, the sheet metal filling the space between the door frame elements and thus providing door frame members of widths desired and requiring only the stocking of the door frame elements and metal sheets.

A further object of this invention is to provide an improved door frame construction which is formed of a plurality of frame members of identical cross-section, the frame members being connected together in rectangular relation and each of the door frame members being of a variable width, the door frame members each being formed of a pair of opposed frame elements connected together by a filler strip, the frame elements being reinforced by tie members disposed within the frame members, certain tie members forming corner grips for reinforcing the joints between the frame members.

These together with other objects and advantages which will become subsequently apparent reside in the details of construction and operation as more fully herein after described and claimed, reference being had to the accompanying drawings forming a part hereof, wherein like numerals refer to like parts troughout, and in which:

Figure 1 is an elevational view of a door frame constructed in accordance with the present invention;

Figure 2 is an enlarged fragmentary vertical sectional view taken through one of the corners of the door frame and shows the manner in which the various frame members are connected together at the corner of the door frame;

Figure 3 is an enlarged fragmentary transverse sectional view taken substantially upon the plane indicated by the section line 3—3 of Figure 1 and shows the specific details of construction of one of the frame members of the door frame; and Figure 4 is an enlarged fragmentary perspective view of one of the frame elements of a door frame member, an upper part of the frame element being cut away and shown in section.

Referring now to the drawings in detail, it will be seen that the door frame assembly which is the subject of this invention is referred to in general by the reference numeral 10. The door frame 10 is formed of a plurality of frame members which are of identical cross-section, the door frame members including a pair of jambs 12 and 14 and a head rail 16. The frame members 12, 14 and 16 are connected together in a rectangular arrangement.

Referring now to Figure 3 in particular, it will be seen that the frame member 16 is formed of a pair of frame elements 18 and 20, which are disposed in spaced relation. The frame elements 18 and 20 are identical in cross-section except for being of a left and right hand configuration.

The frame member 18 includes a side flange 22 and a front flange 24. The side flange 22 terminates at its rear end in a channel shaped extension 26 which may be used for interlocking with wall panels. The front flange 24 terminates in an angle portion 28 which includes a projecting flange 30 and a transverse flange 32.

The side flange 22 is provided with a connecting leg 34 which extends inwardly therefrom. Also extending inwardly from the side flange 22 is a leg 36 which is in opposed relation with respect to a leg 38 carried by the front flange 24 in parallel relation thereto. The legs 36 and 38, together with the front flange 24 form opposed channels 40 and 42, respectively, in which reinforcements (not shown) may be placed.

Projecting inwardly from the projecting flange 30 adjacent the rear edge thereof is a connecting link 44. Also projecting inwardly from the projecting flange 30, but adjacent the transverse flange 32 is a short flange 46 which cooperates with the flange 32 to form a channel 48.

Like the frame element 18, the frame element 20 includes a side flange 50 and a front flange 52. The side flange 50 terminates at its rear edge in an outwardly directed channel 54 which is identical with the channel 26. The front flange 52 terminates in an angle portion 56 which includes a projecting flange 58 and a transverse flange 60.

Extending inwardly from the side flange 50 adjacent the rear edge thereof is a connecting leg 62. The connecting leg 62 is disposed in opposed relation with respect to the connecting leg 34. Also extending inwardly from the side flange 50 adjacent the front flange 52 is a leg 64. Opposing the leg 64 is a leg 66 carried by the front flange 52. The legs 64 and 66 cooperate with the front flange 52 to form opposed channels 68 and 70, respectively, for receiving reinforcements.

Extending inwardly from the projecting flange 58 is a connecting leg 72 which is opposed to the connecting leg 44. Also projecting inwardly from the projecting flange 58 is a relatively short flange 74 which cooperates with the flange 60 to form a channel 76. The channel 76 opposes the channel 48.

In the formation of the frame member 16, the frame elements 18 and 20 are disposed in spaced relation. The space between the angle portions 28 and 56 are connected together by a filler strip 78. The filler strip 78 is formed of sheet metal and may be cut to any width desired thereby permitting the overall width of the frame members 16 to be varied. Incidentally, the filler strip 78 together with the angle portions 28 and 56 form the stop strip which is normally found in a door frame.

It is to be understood that the filler strip 78 contributes somewhat to the strength of the frame member 16. However, the frame member 16 is primarily reinforced by a plurality of tie straps 80 which extend between the legs 44 and 72 and are secured thereto by suitable fasteners 82. Also, suitable tie straps 84 which are formed of structural members, such as channel members or angle members, extend between the legs 34 and are connected thereto by means of suitable fasteners 86. The lengths of the tie straps 80 and 84 will, of course, be varied depending upon the width of the frame member 16.

Referring now to Figure 2 in particular, it will be seen that the corner between the frame member 16 and the frame member 12 is reinforced by an inner angle clip 88 and an outer angle clip 90. The inner angle clip 88 is in the form of an angle cross sectional tie strap and is secured to the legs 44 and 72 by additional ones of the fasteners 82. The angle clip 90 is disposed outwardly of the legs 34 and 62 and are secured thereto by means of suitable fasteners 92.

Inasmuch as the frame members 12, 14 and 16 are of identical cross-section, the specific components of the frame members 12 and 14 will not be described, but like reference numerals will be applied thereto.

From the foregoing description of the door frame 10, it will be seen that keeping in stock desired lengths of extrusions having the cross-sections of the frame members 18 and 20 and lengths of flat stock and structural stock, as well as sheets, door frames of any size may be made. Incidentally, it is pointed out at this time that by turning the frame element 18 end for end, it will function as a frame element 20. Therefore, only one extrusion is required. Further, the projecting flanges 30 and 58 are provided with recesses 94 and 96, respectively, in which suitable weatherstripping (not shown) may be placed if desired.

Although the filler strip 78 has been specifically described as being cut from sheet metal to the desired width, it is to be understood that the invention is not intended to be so limited. In many instances it will be to advantage to use a thin extrusion rather than stock sheet. Thus all of the components of the door frame will match and at the same time the thicknesses of the various components may be less than they would have been if it were necessary to extrude the entire door frame at one time.

The tie straps 84 have been described as being formed of structural members, such as channel members or angle members. However, the tie straps 84 may possibly be formed of wood blocking. This would serve the purpose of the tie strap and at the same time function as a sound deadener which at the present time is occasionally accomplished by filling the hollow portion of the door frame with grouting material.

It is also pointed out that the arrangement of the various components of the door frame construction is such that the various tie straps and other connecting elements may be secured to the individual components of the door frame without the necessity of openings in the components which extend through the exposed part of the completed door frame. Thus by completely confining all of the components of the door frame within the outer exposed surface thereof, the desired appearance of the door frame is maintained even though the door frame is of a three-piece construction.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A door frame member comprising a pair of opposed spaced frame elements, each of said frame elements being in the form of an extruded shape having a side flange, a front flange, and oppositely disposed stop strip defining angle portions including a projecting flange and a transverse flange, a retaining flange connected to an inner surface of said projecting flange rearwardly of said transverse flange in generally parallel relation thereto, a replaceable filler plate extending between said angle portions, said filler plate having edge portions disposed between said transverse flanges and said retaining flanges, opposed connecting legs connected to the inner surface of said projecting flanges immediately forwardly of said side flange, and tie straps extending between and secured to said connecting legs at spaced intervals, said tie straps lying in the plane of said front flanges.

2. A door frame member comprising a pair of opposed spaced frame elements, each of said frame elements being in the form of an extruded shape having a side flange, a front flange, and oppositely disposed stop strip defining angle portions including a projecting flange and a transverse flange, a retaining flange connected to an inner surface of said projecting flange rearwardly of said transverse flange in generally parallel relation thereto, a replaceable filler plate extending between said angle portions, said filler plate having edge portions disposed between said transverse flanges and said retaining flanges, opposed connecting legs connected to the inner surface of said projecting flanges immediately forwardly of said side flange, tie straps extending between and secured to said connecting legs at spaced intervals, said tie straps lying in the plane of said front flanges, other connecting legs connected to an inner surface of said side flanges rearwardly of said front flanges and projecting therefrom in opposed relation structural tie members extending between said frame elements at spaced intervals with ends of said structural tie members being disposed intermediate said front flanges and said other connecting legs, and fastening means securing said structural tie members to said other connecting legs.

3. A door frame comprising a plurality of door frame members secured together in rectangular relation, said door frame members being of identical construction and each door frame member including a pair of opposed spaced frame elements, each of said frame elements being in the form of an extruded shape having a side flange, a front flange, and oppositely disposed stop strip defining angle portions including a projecting flange and a transverse flange, a retaining flange connected to an inner surface of said projecting flange rearwardly of said transverse flange in generally parallel relation thereto, a replaceable filler plate extending between said angle portions, said filler plate having edge portions disposed between said transverse flanges and said retaining flanges, opposed connecting legs connected to the inner surface of said projecting flanges immediately forwardly of said side flange, tie straps extending between and secured to said connecting legs at spaced intervals, said tie straps lying in the plane of said front flanges, abutting ends of said door frame members being mitered, and an angle clip at the intersection of each pair of said door frame members bridging the pair of door frame members and being secured to said connecting legs.

4. A door frame comprising a plurality of door frame members secured together in rectangular relation, said door frame members being of identical construction and each door frame member including a pair of opposed spaced frame elements, each of said frame elements being in the form of an extruded shape having a side flange, a front flange, and oppositely disposed stop strip defining angle portions including a projecting flange and a transverse flange, a retaining flange connected to an inner surface of said projecting flange rearwardly of said transverse flange in generally parallel relation thereto, a replaceable filler plate extending between said angle portions, said filler plate having edge portions disposed between said transverse flanges and said retaining flanges, opposed connecting legs connected to the inner surface of said projecting flanges immediately forwardly of said side flange, tie straps extending between and secured to said connecting legs at spaced intervals, said tie straps lying in the plane of said front flanges, other connecting legs connected to an inner surface of said side flanges rearwardly of said front flanges and projecting therefrom in opposed relation, structural tie members extending between said abutting ends of said door frame members being mitered, and a pair of angle clips at the intersection of each pair of said door frame members and bridging the pair of door frame members, one of said clips being secured to said first mentioned connecting legs and the other of said clips being connected to said other connecting legs.

References Cited in the file of this patent

UNITED STATES PATENTS

| | | |
|---|---|---|
| 385,233 | Boda | June 26, 1888 |
| 2,574,350 | Peele | Nov. 6, 1951 |